W. R. FOX.
ATTACHMENT FOR MULTIPLE DRILLS.
APPLICATION FILED DEC. 2, 1915.
1,210,450.
Patented Jan. 2, 1917.
2 SHEETS—SHEET 1.
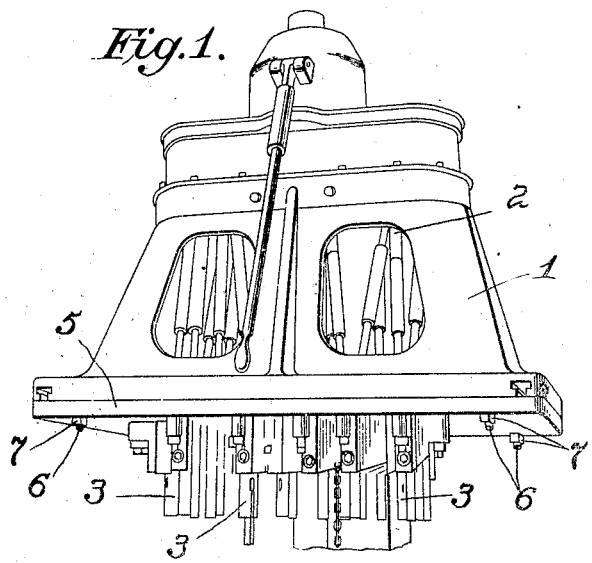
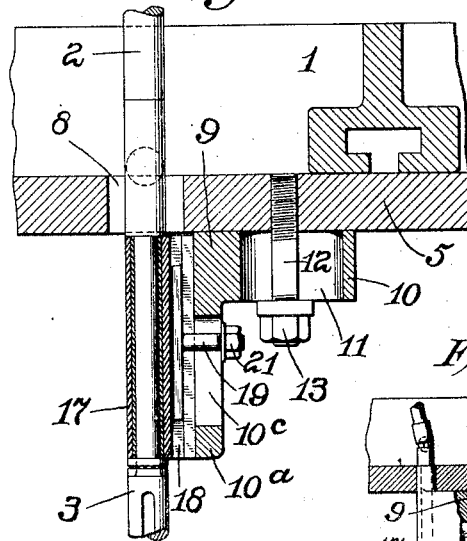
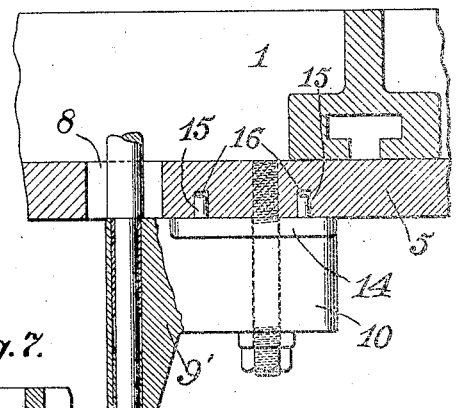
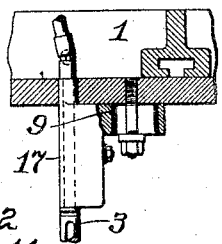
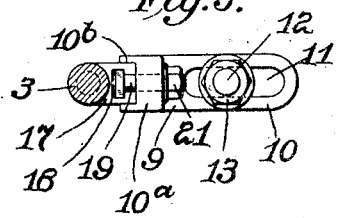
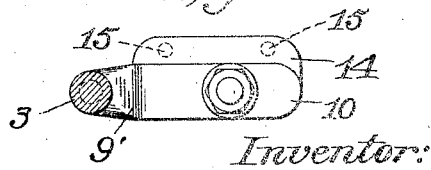
Inventor:
William R. Fox,
by Spear, Middleton, Donaldson & Spear
Attys.

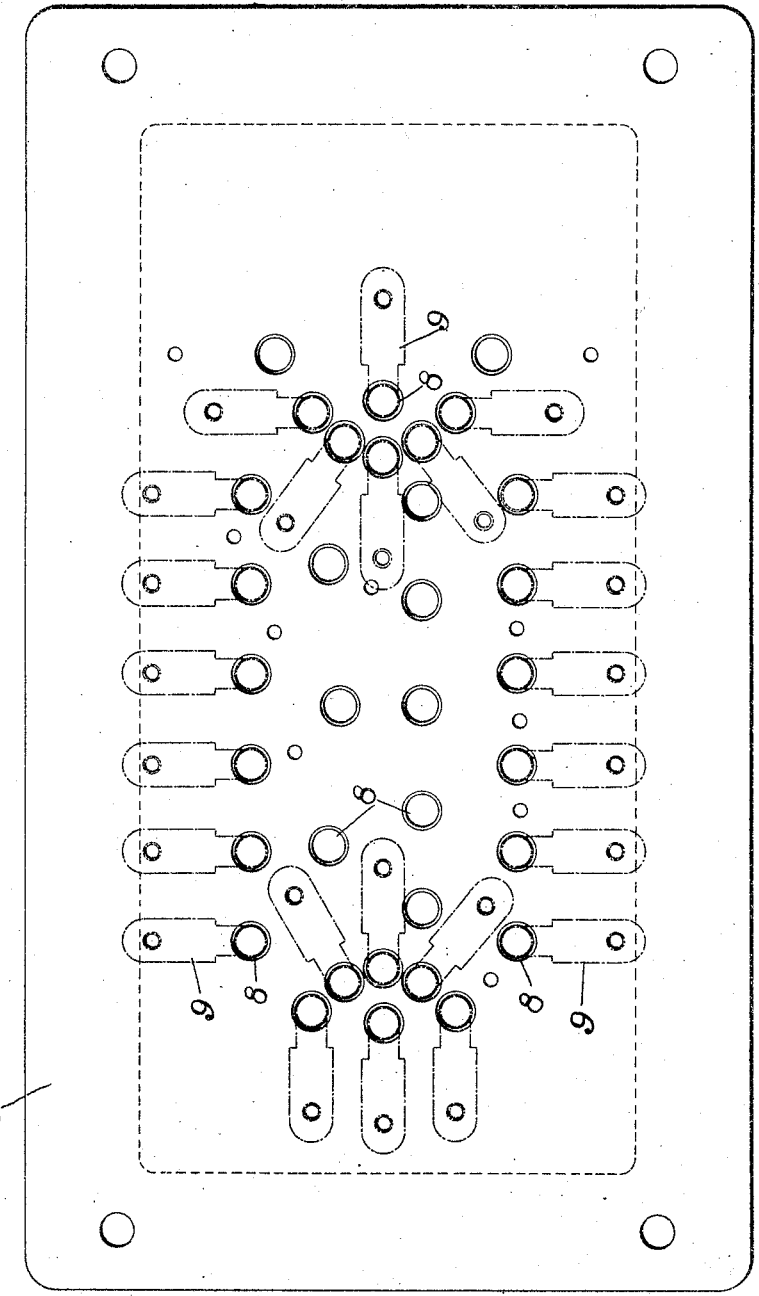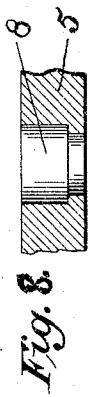

UNITED STATES PATENT OFFICE.

WILLIAM R. FOX, OF GRAND RAPIDS, MICHIGAN.

ATTACHMENT FOR MULTIPLE DRILLS.

1,210,450.     Specification of Letters Patent.     Patented Jan. 2, 1917.

Application filed December 2, 1915. Serial No. 64,744.

*To all whom it may concern:*

Be it known that I, WILLIAM R. Fox, a citizen of the United States, residing at Grand Rapids, Michigan, have invented certain new and useful Improvements in Attachments for Multiple Drills, of which the following is a specification.

The present invention relates to improvements in multiple drills and pertains more particularly to an improved attachment for drills of the type disclosed by my prior Patent No. 1,058,045.

The invention has for its principal object the provision of means which enable a multiple drill of the type above referred to, to be used successfully for a greater variety of work.

In operating multiple drills it is essential that the drilling spindles shall be placed in such relation to the work that they will drill holes in the work in the exact position required, and in order to accomplish this it has been customary to hold the drill in a spindle which is carried by an arm, the spindle having a vertical adjustment, the arm being adjusted on the underside of a round or rectangular head constructed for the purpose of carrying the drill holding arm. In some cases the nature of the work is such that it is necessary to place more spindles within the rectangle than could be carried by the arms which extend to the outside. It was to meet these requirements that the present invention was designed and it consists essentially of a removable plate, which will hereinafter be referred to as a "cluster" plate, adapted to be attached to the underside of the drill head, to which the several drills are attached in any desired manner. This "cluster" plate is preferably rectangular in form to fit the underside of the drill head and is provided with holes which are arranged according to the position in which it is desired to have the spindles located. The spindles pass through these holes and are adapted to fit the holes closely or to have adjustable bearings provided therein as the case may be. In either case a short arm is attached to the underside of the cluster plate, adjustably or otherwise and the spindle is supported thereby.

With these and other objects, the invention consists in the combination and arrangement of parts more fully described in the following specification, illustrated in the accompanying drawings, and more particularly pointed out in the appended claims.

In the drawings, Figure 1 is a perspective view of the drill head of a multiple drill, equipped with one embodiment of the present invention. Fig. 2 is a plan view of a cluster plate showing one scheme by which the drills may be arranged thereon. Fig. 3 is a vertical section through a portion of the cluster plate, showing one manner in which the drills may be attached thereto. Fig. 4 is a similar view showing a different arrangement, and Fig. 5 is a top plan view of one of the supporting brackets. Fig. 6 is a bottom plan view of a supporting bracket shown in Fig. 4. Fig. 7 is a view similar to Fig. 3 showing a detail of a modification. Fig. 8 is a sectional detail through one of the holes in the cluster plate.

Referring to the drawings the upper head 1 of a multiple drill is shown in Fig. 1. Within the upper part of this head a number of vertically disposed driving spindles 2 are arranged, being driven by suitable gearing located at their upper ends. To the lower ends of these driving spindles 2 are attached the drill spindles 3 (here shown projecting below the lower surface of the head 1.) The drill spindles 3 may be directly coupled to the driving spindles 2 or they may be connected by means of an intermediate flexible coupling or joint. At the under side of the head 1, the "cluster plate" 5 is fixedly attached by means of the bolts 6 and nuts 7. The exact design or scheme for the arrangement of the drill spindles in the "cluster plates" is not material and may be varied to suit the particular requirements of the work to be done. In any event, however, the cluster plate is perforated with a number of holes 8 through which the upper ends of the drill spindles 3 project into the upper gear spindle box portion of the head 1.

In the detail section shown in Fig. 3 a supporting arm 9 is secured to the underside of the "cluster plate" 5 in proper relation to the hole 8 to form a suitable adjustable bearing for the drill spindle 3. This bracket arm 9 consists of a horizontally disposed portion 10 which may be slotted as at 11 for the purpose of adjusting its position on the "cluster plate" by means of the bolt and nut 12 and 13, respectively, with which it is clamped in place. If it is not desired to vary the adjustment of the bracket arm 9, (Figs. 4 and 6) it may be provided with a web piece 14, integral with the upper horizontal portion 10, having dowel pins 15 adapted to register with holes 16 in the "cluster plate" 5. The other part of the bracket arm 9 comprises a vertical portion 10ª channeled as at 10ᵇ and having a horizontally disposed opening 10ᶜ therethrough. A clamping piece 17 forming a bearing around the spindle 3 is provided having a dovetailed groove 18 formed vertically therein. A bolt 19 with its head in the groove 18 projects through the transverse channel 10ª of the bracket 9 and has a nut 21 threaded on its outer end. By these means the relative position of the spindle may be adjusted vertically and laterally within the limits of the diameter of the hole 8 of the "cluster plate" 5.

Fig. 4 shows a modified form of bracket arm 9' providing a bearing for the drill spindle 3 without any vertical or lateral adjusting features and with the member 10 having dowel pins 15 engaging with holes in the underside of the cluster plate.

Fig. 2 is a plan view illustrating one scheme or arrangement by which a plurality of drills may be attached to the underside of the "cluster plate" 5 by the supporting bracket arms 9. A careful inspection of this figure will show the utter inability to fasten a similar number or arrangement of drill spindles according to the old form by use of adjustable side arms. It is to be understood that the present invention is not intended to be limited to any precise scheme of placing the spindle holes 8 in the cluster plate, and that the system of perforations may be varied at will without departing from the spirit of the invention.

In practice a multiple drill, such as is here described, is used when a large number of holes are to be formed in a piece of work and further in order to operate a drill of this character economically there must be a large number of pieces of the same character to be drilled. If however, the supply of work should be comparatively small there would be frequent occasion to vary the position and adjustment of the several drill spindles. In an ordinary drill this is done by shifting the arms to different positions, which requires considerable time as each arm must be located accurately so that the drill will enter the jig bushing in proper alinement. By use of the present cluster plate these difficulties are overcome, so that a considerable saving of time and work is accomplished.

From the foregoing description it will be seen that the cluster plate can be used in different ways; for example where it is desirable to detach the arms 9 from the plate 5, the arms are either doweled on the plate, as in Fig. 4, or the plate is accurately bored to receive the spindle bearing, as in Fig. 7, in which case the arms can be removed from the plate and can be quickly and accurately replaced at any time. Hence with the construction shown in Fig. 3 it is frequently desired in practice, where a great many pieces of work of the same scheme of marking are to be operated upon, to leave the arms in one position. When the work is changed the cluster plate can be quickly detached from the head without disturbing the position of the several brackets or arms. Universal slip socket joints at the upper end of the several drill spindles permit of this quick detachment of the parts.

The difference between the construction shown in Fig. 7 and that shown in Fig. 4, is that the large hole in Fig. 4 can be bored at an approximate position and after all the arms are set and the work has been drilled the plate can be taken off and turned bottom upward and the dowel pins put in, which will insure a quick setting for two operations.

Having thus described my invention, what I claim is:

1. In combination with a multiple drill, having a spindle supporting head, a removable cluster plate secured thereto, and a plurality of drill spindles carried by said plate.

2. In combination with a multiple drill, having a spindle supporting head, a cluster plate detachably secured to the underside thereof, and a plurality of drill spindles carried by said plate.

3. In combination with a multiple drill, having a spindle supporting head, a rectangular cluster plate, detachably secured to the underside of said head, means on said plate affording bearings for the spindles and a plurality of drill spindles carried by said means.

4. In combination with a multiple drill having a spindle supporting head, a rectangular perforated plate detachably secured to the underside of said head, a plurality of drill spindles projecting up through the perforations in said plate, and adjustable bearing brackets attached to said plate and supporting said drill spindles.

5. In combination with a multiple drill having a spindle supporting head, a rectangular perforated cluster plate detachably secured to the underside of said head, a plurality of drill spindles, and a plurality of supporting brackets secured to said cluster plates and supporting said drill spindles, said brackets being provided with means for varying the longitudinal adjustment of the spindles and also the lateral adjustment of same within the limits of the perforations through which the spindles pass.

6. In combination with a multiple drill, having a spindle supporting head, a removable cluster plate secured thereto and a plurality of drill spindles carried by said plate and removable therewith.

7. In combination with a multiple drill having a spindle supporting head, a removable cluster plate secured thereto and a plurality of drill spindles detachably carried by said plate.

WILLIAM R. FOX.

Witnesses:
  MYRA JONES,
  FLORENCE GERMAN.